United States Patent [19]

Brandt et al.

[11] E Re. 30,386

[45] Reissued Aug. 26, 1980

[54] METHOD OF REDUCING THE AFLATOXIN CONTACT OF OILSEED MEAL PRODUCTS

[75] Inventors: Jean Brandt; Claude Giddey; Guy Bunter, all of Geneva, Switzerland

[73] Assignee: Etablissements V.Q. Petersen & Cie, Senegal

[21] Appl. No.: 820,830

[22] Filed: Aug. 1, 1977

Related U.S. Patent Documents

Reissue of:

[64] Patent No.: 3,890,452
Issued: Jun. 17, 1975
Appl. No.: 441,741
Filed: Feb. 12, 1974

U.S. Applications:

[63] Continuation of Ser. No. 666,007, Mar. 11, 1976, abandoned.

[30] Foreign Application Priority Data

Feb. 13, 1973 [CH] Switzerland ..... 2005/73

[51] Int. Cl.[2] ..... A23K 3/00
[52] U.S. Cl. ..... 426/335; 426/630
[58] Field of Search ..... 426/321, 331, 335, 623, 426/626, 630, 635, 807; 424/156, 157, 158, 127, 325; 260/123.5

[56] References Cited

U.S. PATENT DOCUMENTS

| | | | |
|---|---|---|---|
| 3,429,709 | 2/1969 | Masri | 426/335 |
| 3,585,041 | 6/1971 | Mann | 426/231 |
| 3,689,275 | 9/1972 | Espoy | 260/123.5 |

OTHER PUBLICATIONS

The Condensed Chemical Dictionary–Hawley 8th Ed. Van Nostrand Reinhold Co., p. 519, 1971.

Journal of the American Oil Chemists Society—v47, pp. 173–176 (1970)—Mann.

*Primary Examiner*—Hiram H. Bernstein

*Attorney, Agent, or Firm*—Robert E. Burns; Emmanuel J. Lobato; Bruce L. Adams

[57] ABSTRACT

There is disclosed a method of reducing the aflatoxin content of all contaminated oilseed meal products. A homogeneous mixture comprising the product, from 10 to 40 percent by weight of water, at least one oxide and/or hydroxide of an [alkali metal or] alkaline earth metal, and at least one organic amine is formed. The quantity of oxide and/or hydroxide is such that the mixture has a pH of at least 8. The quantity of organic amine is such that this pH is raised to at least 9.5 percent. The mixture is reacted at a temperature below 150° C. to reduce the aflatoxin content of the mixture to less than 100 parts per thousand million. The detoxified mixture is then dried.

17 Claims, No Drawings

METHOD OF REDUCING THE AFLATOXIN CONTACT OF OILSEED MEAL PRODUCTS

Matter enclosed in heavy brackets [ ] appears in the original patent but forms no part of this reissue specification; matter printed in italics indicates the additions made by reissue.

*This is a continuation of now abandoned application, Ser. No. 666,007, filed Mar. 11, 1976 to Reissue U.S. Pat. 3,890,452 issued June 17, 1978.*

BACKGROUND OF THE INVENTION

The invention relates to a method of reducing the aflatoxin content of an oilseed meals.

Aflatoxins $B_1$, $B_2$, $G_1$, $G_2$ are highly toxic metabolites developed by certain moulds, more particularly by Aspergillus Flavus. The latter mould grows on peanut-oil seed, cottonseed and other seeds in tropical climates having a relative humidity of more than 85 percent. Aflatoxins are very stable chemically, owing to their molecular structure. They are not affected by thermal treatment at 160° C. for an hour.

Among the aforementioned aflatoxins, aflatoxin $B_1$ is considered the most toxic and is most frequently present in cakes of oil-bearing seeds and other products liable to be infected by Aspergillus Flavus. The aflatoxin can be detoxified only by profoundly modifying the original chemical structure of the toxin. Research has shown, however, that it is not sufficient to open the lactone ring (shown in analysis by the disappearance of the fluorescent chromatographic spots characteristic of aflatoxin) since, as can be shown, the molecule can revert to its original form and become toxic again. The molecule must be destroyed by oxidizing certain parts of it (the double bonds in the ring), in which case the starting substance must be the "open lactone ring" form. Experience shows that though the ring is opened by alkalinity in general, it is oxidized only by alkalinity produced by certain strong alkalis.

Food contaminated by aflatoxins is unsuitable for consumption. The F.A.O. have fixed the total quantity of aflatoxin acceptable in animal food at 50 ppb. The abbreviation "ppb" means "parts per billion," which is equivalent to "mg/tonne". The term "billion", as used herein, means "1,000,000,000". This limit is much lower than the 200 to 1000 ppb frequently found in contaminated peanuts or peanut oil cakes. Peanut oil cakes are an important substance in fodder for animals such as cattle and poultry, and consequently much research has been done in order to find means of decontamination.

It has been proposed, for example, to use the fermentation method. Some micro-organisms are capable of metabolizing (destroying) aflatoxins, using as substrate the polysaccharides present in the oil cakes. This method has the disadvantage of requiring expensive installations and relatively long treatment. It is used in certain industrial countries such as France, where the climate is less humid and Aspergillus Flavus cannot start growing again from its spores.

It has also been proposed to use an extraction method and organic solvents. A number of organic solvents such as methanol, ethanol, acetone and chloroform can extract aflatoxin from oil cakes. This method requires expensive installations and may be dangerous, since the solvents are inflammable. It has the further disadvantage of eliminating other fatty residues in the oil cakes, thus lowering their nutritional value.

Methods of detoxication have also been proposed wherein use is made of chemical products capable of converting aflatoxins. Although many chemical agents can react with aflatoxins, use can be made of only a few, either because they are themselves toxic or because they excessively reduce the nutritional value of the products treated, or because they are too expensive.

Strong bases are the most effective. They hydrolyze the lactone in aflatoxins and form the corresponding salt of the carboxyl group and the phenolate:

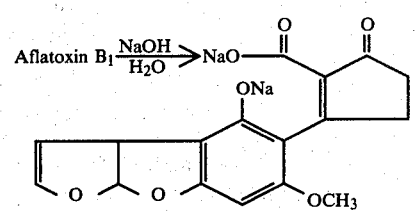

In this form, aflatoxins slowly oxidise in air and disappear from the oil cakes in a few weeks.

In one known method (U.S. Pat. No. 3,429,709) the reagent used is ammonia. Ammonia, however, is not a sufficiently strong base; it is very volatile and cannot be used at ambient pressure and at a temperature of 80°-100° C. The pH of a hydrated product (20% water) is of the order of 8.5 to 9 before heating but falls to 8-8.5 during treatment at 90°-100° C.

It has also been proposed (U.S. Pat. No. 3,585,041) to use methylamine which is less volatile than ammonia and gives a pH which is 1 to 1.5 pH units greater than that given by the same molecular concentration of ammonia—i.e. methylamine is about 20 times as strong a base. However, it is very disadvantageous to use methylamine in the proposed proportions (0.6-1.5 percent of the weight of the contaminated product), since it is difficult to eliminate the methylamine from the product, which acquires a pungent smell and disagreeable taste which persists even after vacuum treatment or exposure to air for several weeks. Probably methylamine becomes relatively strongly fixed to the acid (—COOH) groups of the proteins.

The object of the invention is to provide a method which, though using an organic amine as the reagent, obviates the aforementioned disadvantage of the known method.

SUMMARY OF THE INVENTION

The method according to the invention comprises forming a homogeneous mixture comprising: the crushed oil seeds, from 10 to 40 percent by weight of water, at least one basic agent selected from the group consisting of the oxides and hydroxides of [alkali metals and] alkaline earth metals in an amount such that the homogeneous mixture has a pH of at least 8, and at least one organic amine in an amount sufficient to further raise the pH to at least 9.5; reacting the homogeneous mixture by maintaining the mixture at a temperature below 150° C. for a time sufficient to reduce the aflatoxin content of the product to less than 100 ppb; and drying the resulting detoxified product to reduce its water content.

The method of the invention is applicable to contaminated agricultural products of animal or plant origin, e.g. the products disclosed in U.S. Pat. Nos. 3,429,709 and 3,585,041. The products should have a fats content of less than 10 percent.

DESCRIPTION OF THE PREFERRED EMBODIMENTS

According to the invention, alkalinity in the presence of moisture is obtained by using a non-volatile basic agent and a volatile highly basic agent, used in minimum concentration. The non-volatile basic agent, namely the oxide or hydroxide of an [alkali metal (e.g. sodium or potassium) or] alkaline-earth metal (e.g. calcium), neutralizes the natural buffer effect of proteins and gives a minimum basic pH providing the conditions under which the aflatoxin is chemically modified. Suitable non-volatile basic agents include calcium oxide or hydroxide [and sodium and potassium hydroxides]. The volatile basic agent, used in small quantities, provides the excess basicity for ensuring the rapid, complete destruction of the aflatoxins. Subsequently, the volatile agent is eliminated by evaporation (drying) together with the water added to the product before processing. The volatile agent is an organic amine, for example methylamine, dimethylamine, trimethylamine, ethylamine, or a mixture thereof.

Methylamine is preferably used, since it has the advantage of providing high alkalinity ($pK_8=3.37$ at 25° C.), and has a relatively high boiling point (−6.3° C.) compared with, for example ammonia, but can still be subsequently eliminated by evaporation.

The use of a non-volatile basic agent, to increase the pH of the product to at least 8, allows a very substantial reduction of the amount of the volatile agent to be used. As a matter of fact, tests have shown that already 0.1 percent by weight of an amine permits a hydrolysis reaction and destruction of aflatoxins to be achieved in a satisfactory manner. These tests have likewise shown that the maximum useful amount of volatile agent, namely the amount necessary to raise the pH to the optimum value for the reaction, is situated at 0.6 percent. Indeed, an increase in the amount of volatile agent above 0.6 percent does not have an appreciable effect on the elevation of the pH and consequently at the efficacy of the reaction.

Very small quantities of amine, less than the minimum quantity usable in the known methods, can consequently be used owing to the presence of the non-volatile basic agent.

The non-volatile base, besides acting in the manner described, facilitates the volatilization of the volatile base, since the natural acid groups in the product remain preferentially blocked by the non-volatile base.

Drying to reduce the moisture content of the detoxified product to a desired value, especially to between 5 and 10 percent, can be accelerated by crushing the product into coarse meal.

The basicity of the product after drying is due mainly to the presence of the non-volatile base. Neutralization can be carried out by adding an organic or inorganic acid, preferably phosphoric acid, which reduces the pH to below 7 and forms calcium phosphate, a valuable mineral constituent in animal fodder. The neutralization also eliminates any disagreeable odour or taste remaining in the product. At the concentration used (below 0.6%) the amine does not produce any observable change in the taste or smell of the product.

The invention will now be illustrated by the following Examples 1 and 2.

EXAMPLE 1

30 g of slaked lime was mixed with 1500 g of crushed peanut oil cake containing 2,000 ppb of aflatoxin. A solution of 24 ml of 40 percent methylamine diluted in 255 ml water was added as uniformly as possible to the oil cake. The mixture, which has a pH of approximately 10, was then extruded while cold to form compact pellets. The extruder body was cooled so that the pellets leave it at a relatively low temperature in order to prevent premature evaporation of water and methylamine. The pellets were stored at ambient temperature for 15 days and crushed and dried in the open air for 2 days in order to reduce their water content to about 9 percent. The aflatoxin content of the pellets was below 100 ppb (100 mg/tonne).

EXAMPLE 2

30 g of slaked lime was mixed with 1500 g of crushed peanut oil cake containing 900 ppb of aflatoxins. A solution of 12 ml of 40 percent dimethylamine diluted in 255 ml water was added to the oil cake. The mixture, which had a pH of approximately 9.7, was extruded while cold, forming comptact pellets which were then heated to 100° C. for 2 hours at normal pressure. The pellets were crushed and dried in an oven at 70° C. for 4 hours in order to reduce their water content to about 6 percent. The proportion of aflatoxin destroyed was about 95 percent.

As the preceding Examples show, the length of the detoxification process is inversely proportional to the temperature thereof. The duration can be further reduced by detoxification at a pressure above atmospheric pressure, thus avoiding losses of water vapour and gaseous amine. The length of detoxification can be reduced to less than 10 minutes by performing the reaction at a temperature between 70° and 150° C. at a pressure above atmospheric pressure and by continuously mixing the reacting substances. The object of mixing is to enable the basic agents to penetrate fully into the product and provide intimate contact between them.

Mixing is preferably carried out continuously in an extruder comprising an endless worm and heated by water, steam or electricity at the processing temperature. The length of the worm and its speed of rotation are chosen in dependence on the duration of treatment; which is usually between 1 and 10 minutes. The mechanical pressure produced by the extruding worm maintains the desired physical and chemical conditions and ensures that the basic agents penetrate fully into the product. The entire volume is occupied by the mixer, so that there is no free space in which gases can escape from the mixture and lose contact therewith, as happens during batch operation in an autoclave provided with an agitator.

The product, which leaves the extruder at an elevated temperature, very quickly loses the amine and some of its moisture. Subsequent drying reduces the moisture content to between 5 and 10 percent. Drying can be accelerated by crushing the extruded product into coarse meal.

The invention will now be further illustrated by the following Examples 3–6.

EXAMPLE 3

40 g of slaked lime were mixed with 2,000 g of crushed peanut oil cake containing 1,500 ppb aflatoxin. A solution of 11 ml of 40 percent methylamine diluted in 255 ml water was added to the oil cake. The mixture, which had a pH of approximately 9.7, was formed into pellets which were heated to 140° C. for 20 minutes in an autoclave (at a pressure of approximately 3.5 kg/cm$^2$ produced by the water vapour present). The pellets were crushed and mixed with a quantity of phosphoric acid such that the pH of the mixture was brought to 6.5.

The mixture was dried in an oven at 80° C. until its water content was 7 percent. The aflatoxin destruction rate was 97 percent.

EXAMPLE 4

500 g of peanut meal [contaoning] *containing* 500 ppb aflatoxin were poured into a Hobart-type planetary mixer rotating at speed 1. An aqueous treating suspension was slowly added over a period of approximately 3 minutes. The treating suspension was prepared as follows: 6.5 ml of an aqueous solution of 40 percent methylamine (weight/volume of solution) was diluted in 125 ml water, 10 g of slaked lime [$(Ca(PH)_2)$] *($Ca(OH)_2$)* were added and the mixture was agitated to obtain a uniform suspension.

After the suspension had been added to the meal, the substances were further mixed for 30 minutes and then continuously introduced via a feed worm into a Brabender extruder (Type 826600). The main extruder body and the extrusion head previously had been heated to 100° C. by electric heating jackets, the operation of which was regulated by three thermocouples whose temperatures were recorded. The extruder worm rotated at 5 rpm corresponding to thermal treatment of the product for 5 minutes. Detoxification was therefore performed at a pressure of approximately 1.5 kg/cm$^2$ and at a temperature of approximately 110° C.

The substance left the extruder in the form of a wet cylinder or roll which was dried until its moisture content was about 7 percent. Drying could be accelerated by grinding the roll into coarse meal, which was then dried.

The dried product had an aflatoxin content of less than 50 ppb (50 mg/tonne).

EXAMPLE 5

The method was the same as in Example 4 until the roll having a moisture content of 7 percent was obtained. The roll was then crushed, and 70 ml of 70 percent phosphoric acid solution was added with agitation to the resulting meal in order to reduce the pH of the product to 7 or below, i.e. to neutralize the product.

EXAMPLE 6

The apparatus used was an industrial extruder modified for food pastes and having a worm 233 cm long and 13.5 cm in diameter. A mixer disposed upstream of the worm had a capacity of 150 to 200 kg of oil-cake meal and was able to uniformly mix the basic agents with the oil cake, infected with aflatoxin. The mixer may also be continuously supplied with the oil cake and with the basic reagents.

The method was as follows: 3 kg of slaked limed were mixed with 150 kg of peanut oil-cake meal having a particle size of 1 to 3 mm and containing 900 ppb of aflatoxin, the mixing process lasting 15 minutes. A quantity of 2,250 liters of a 40 percent solution of methylamine was diluted in 25.2 liters of water and added to the oil cake in fractions, between which mixing was continued for about 1 minute. After all the solution had been added, mixing was continued for about 10 to 15 minutes. The extrusion process, which was carried out at 110° to 112° C., and passage through the extruder lasted for about 5 minutes. The resulting destruction rate of aflatoxin was of the order of 95 percent.

As the preceding shows, the method according to the invention is preferably continuous. The method can substantially reduce the length and cost of treatment and provides a product free from disagreeable taste or smell, owing to the low concentration of the amine, the use of a non-volatile base and, in a preferred embodiment, continuous mixing at a pressure higher than atmospheric pressure.

We claim:

1. A method of reducing the aflatoxin content of an aflatoxin contaminated oilseed product having *an aflatoxin content of about 500 to 2000 ppb. and* a fats content less than 10 percent, which comprises the steps of:

a. forming a homogeneous mixture comprising: the crushed product, from 10 to 40 percent by weight of water, at least one basic agent selected from the group consisting of the oxides and hydroxides of [alkali metals and] alkaline earth metals in an amount such that the homogeneous mixture has a pH of least 8, and at least one organic amine in an amount *of from about 0.1 to 0.6% by weight, the amount of said organic amine being* sufficient to further raise the pH to at least 9.5;

b. reacting the homogeneous mixture by maintaining the product at a temperature between room temperature and 150° C. for a time sufficient to reduce the aflatoxin content of the product to less than 100 ppb; and c. drying the resulting detoxified product to reduce its water content.

2. The method according to claim 1, wherein [the amount of organic amine in the homogeneous mixture is from 0.1 to 0.6 percent by weight] *and said basic agent is lime which is present in said homogeneous mixture in an amount of about 2% by weight based on weight of said oilseed product.*

3. The method according to claim 1, wherein the homogeneous mixture is maintained at a temperature below 150° C. for a time sufficient to reduce the aflatoxin content in the product to less than 50 ppb.

4. The method according to claim 1, wherein the mixture is reacted at a pressure greater than atmospheric pressure.

5. The method according to claim 4, wherein the mixture is continuously mixed during the reaction.

6. The method according to claim 1, wherein the reaction is carried out at a temperature between 70° and 150° C. and at a pressure greater than atmospheric pressure, and the mixture is continuously mixed during reaction.

7. The method according to claim 1, wherein the product is peanut oil meal.

8. The method according to claim 1, wherein the organic amine is selected from the group consisting of methylamine, dimethylamine, trimethylamine and ethylamine or mixtures thereof.

9. The method according to claim 1, wherein the basic agent is selected from the group consisting of calcium oxide, calcium hydroxide, [sodium hydroxide and potassium hydroxide].

10. The method according to claim 5, wherein an extruder having an endless worm is used for mixing, and the speed of rotation of the worm is such that the duration of reaction is from 1 to 10 minutes.

11. The method according to claim 10, wherein the extruded detoxified product is crushed before drying.

12. The method according to claim 1, wherein the detoxified product is dried to a moisture content of from 5 to 10 percent.

13. The method according to claim 12, wherein phosphoric acid is added to the dried product in a quantity sufficient to bring the pH of the product to a value not exceeding 7.

14. The method according to claim 1 wherein said homogeneous mixture is pelletized prior to the reacting of said mixture.

15. The method according to claim 1 wherein said dried detoxified product is formed into feed oil cakes.

*16. The method according to claim 1 wherein said homogeneous mixture comprises calcium oxide or calcium hydroxide in an amount of about 2% by weight and wherein the pH of said homogeneous mixture is raised to a maximum of about 10 by the addition of said amine.*

*17. The method according to claim 1 wherein said oilseed product is peanut oil meal, said basic agent is selected from the group consisting of calcium oxide and calcium hydroxide and is present in said homogeneous mixture in an amount of about 2% by weight, said organic amine is selected from the group consisting of methyl amine, dimethyl amine, trimethyl amine and mixtures thereof and the pH of said homogeneous mixture is raised to a maximum of about 10 by the addition of said amine, and wherein the reaction is carried out at a temperature between 70° and 150° C. and pressure greater than atmospheric pressure and the mixture is continuously mixed during the reaction.*

* * * * *